United States Patent
Wallin

(10) Patent No.: US 6,599,459 B2
(45) Date of Patent: Jul. 29, 2003

(54) METHOD FOR ROTATIONAL MOLDING WITH MOVABLE INSERT

(76) Inventor: Craig Wallin, 902 W. 400 North, Logan, UT (US) 84321

( * ) Notice: Subject to any disclaimer, the term of this patent is extended or adjusted under 35 U.S.C. 154(b) by 0 days.

(21) Appl. No.: 10/284,004
(22) Filed: Oct. 28, 2002

(65) Prior Publication Data
US 2003/0057604 A1 Mar. 27, 2003

Related U.S. Application Data

(62) Division of application No. 09/573,725, filed on May 18, 2000, now Pat. No. 6,494,705.

(51) Int. Cl.⁷ ........................... B29C 41/06; B29C 41/52
(52) U.S. Cl. ..................... 264/311; 264/325; 425/435; 249/158
(58) Field of Search ................................ 264/310, 311, 264/312, 325; 425/409, 418, 419, 429, 427, 426, 435; 249/158, 129

(56) References Cited

U.S. PATENT DOCUMENTS 4,741,972 A * 5/1988 Hardigg ................... 428/542.8
4,776,782 A 10/1988 Murayama

FOREIGN PATENT DOCUMENTS

GB 2 259 475 A * 3/1993

* cited by examiner

Primary Examiner—Stefan Staicovici
(74) Attorney, Agent, or Firm—Harris Zimmerman

(57) ABSTRACT

A method for rotational molding uses a mold having first and second mold components defining therebetween a mold cavity. The first mold component includes a mold insert adapted to translate toward the second mold component. A spring-biased latch mechanism restrains the mold insert in the outward disposition, and a touch pad is struck to trigger the latch mechanism and urge the mold inwardly while the mold is rotating. In another aspect, the invention includes a method for rotational molding that employs the rotational mold described above. With the mold insert latched in the outward disposition, the rotational mold charged with thermoplastic material rotated biaxially and heated. After heating, while the mold assembly continues to rotate, the touch pad is struck to release the latch and cause the mold insert to move inwardly. The mold insert includes structural features that are moved more proximate to opposed mold portions.

5 Claims, 6 Drawing Sheets

METHOD FOR ROTATIONAL MOLDING WITH MOVABLE INSERT

This is a Divisional of application Ser. No. 09/573,725 filed on May 18, 2000 now U.S. Pat. No. 6,494,705.

BACKGROUND OF THE INVENTION

The present invention generally relates to rotational molding, and, more particularly, to a method and apparatus for forming superior molded parts using a rotational mold having a moving insert.

Rotational molding, also known as rotomolding, is a production process in which a liquid or powdered thermoplastic is charged into a hollow mold and then rotated continuously in a biaxial mode in a high temperature environment to form hollow complex parts. Rotational molding has become widely adopted, particularly for forming complex, hollow parts, many of which cannot be manufactured by any other commercially feasible process. The mold surface is reproduced exactly, and there is little or no requirement for finishing work.

It is apparent that the distribution of molding material within the mold is carried out only by the force of gravity applied to the liquid thermoplastic material as the mold is rotated. Generally this technique is very effective in replicating the minute details of the mold surface, and to deposit a generally uniform sidewall buildup on the mold surface. As a result, rotational molding has been found to produce reliable, uniform parts in a great variety of shapes and sizes.

Rotational molding is not without drawbacks, however. It is known in the art that component configurations that require opposed sides of the mold to be in close proximity may cause poor quality parts to be molded. The liquid thermoplastic material has viscosity and surface tension properties that may limit or inhibit the flow of the liquid material between opposed, closely spaced mold surfaces. The limited material flow can lead to thin wall portions or voids in the sidewall that may compromise the structural integrity of the molded part, create a path for leaks into or out of the molded part, or the like. Thus some desirable structural features commonly used to impart strength or structural rigidity, such as a solid rib formed at the peripheral edge of the sidewall of the molded part, cannot be molded reliably, nor can integral structural coffers be formed in the sidewall if they are too closely spaced or touching the opposite sidewall. These limitations may constrain the design freedom of a designer of molded parts.

SUMMARY OF THE INVENTION

The present invention generally comprises a method and apparatus for rotational molding that enables the production of a wider range of molded parts. In particular, the invention provides a molding technique that produces features heretofore unattainable, such as a solid rib formed at the peripheral edge of the sidewall of the molded part, or closely spaced opposed surfaces.

In one aspect, the invention provides a rotational mold having first and second mold components defining therebetween a mold cavity. The first mold component is provided with a mold insert that is adapted to be translated toward the second mold component to an inward position in the mold cavity. The first mold component includes spring assemblies for resiliently biasing the mold insert inwardly, and a latch mechanism is also provided to restrain the mold insert in the outward disposition. The latch mechanism includes a touch pad which may be struck to trigger the latch mechanism and permit the mold insert to be driven by the spring assemblies inwardly into the mold cavity.

In another aspect, the invention includes a method for rotational molding that employs the rotational mold described above. With the mold insert latched in the outward disposition, the rotational mold is separated and charged with thermoplastic material, closed and sealed, and placed in a furnace and rotated biaxially. After the heating phase is finished, the rotating mold is moved to a cooling station. During the cooling process and while the mold assembly continues to rotate biaxially, the touch pad of the latch is struck to release the latch and cause the mold insert to move inwardly. The mold insert includes structural surfaces and features that are moved more proximate to opposed mold portions. As a result, component features that are too closely spaced to be reliably molded by prior art rotational techniques are fully formed by the mold insert in a more spaced apart relationship and brought into close spacing or impingement by movement of the mold insert. Thus closely spaced structures that were heretofore unattainable by rotational molding may be created simply and reliably.

The method and apparatus described above may be used to fabricate a bus bumper cover by rotational molding techniques. The bumper cover includes a longitudinally extending housing having front and rear sidewalls in spaced apart relationship, with a tail panel extending obliquely from one end of the housing. The peripheral edge of the housing includes a thick, solid rib extending along the peripheral edge thereof. Also, a plurality of concave coffers extend inwardly in the inner sidewall to join the front sidewall for enhanced structural strength and impact resistance. The solid rib portions and the concave structural coffers are formed by the molding surface of the mold insert described above, and are properly and fully formed during rotational heating of the mold with the mold insert is extended in the outward position. After the heating stage is completed and while the mold continues to be rotated biaxially, the latch is triggered to move the mold insert inwardly, so that the fully formed surface features within the mold may be brought into a closely spaced or impinging relationship that would otherwise be impossible to obtain with prior art rotational molding techniques.

DESCRIPTION OF THE PREFERRED EMBODIMENT

Figure 5:
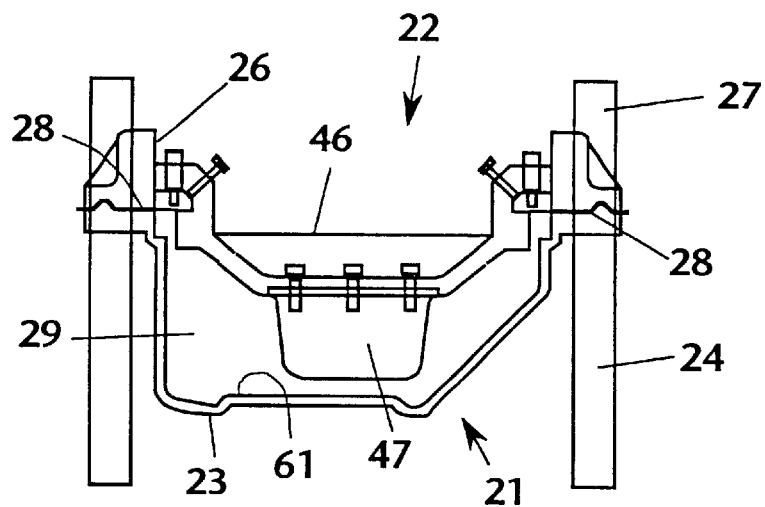
FIGS. 5–7 are a series of cross-sectional end elevations taken along lines 5—5, 6—6, and 7—7, respectively, of FIG. 1.
Figure 6:
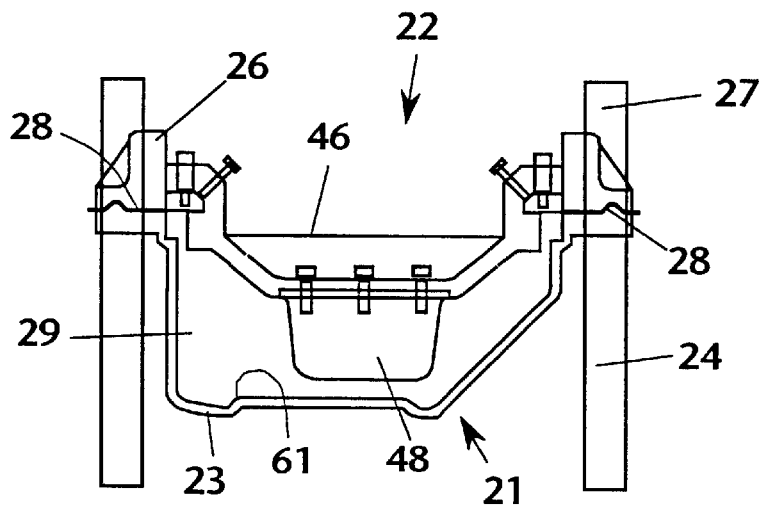
Figure 7:
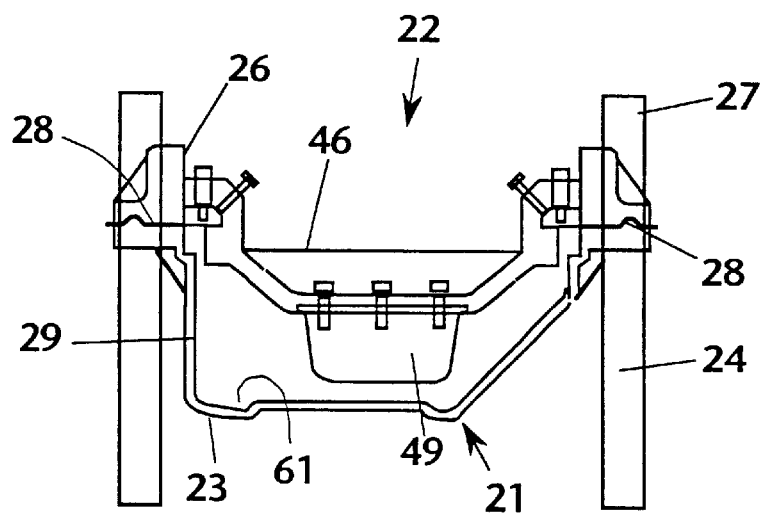

The present invention generally comprises a method and apparatus for rotational molding. With regard to FIG. 1, the apparatus includes a first mold assembly 21 and a second mold assembly 22. The first mold assembly includes an interior surface mold component 23 supported by a frame 24 formed of tubular box rail members welded or bolted together. The second mold assembly 22 includes a mold component 26 supported by a frame 27, also of box rail construction, the two mold components 23 and 26 being joined along a parting line 28 to define an interior mold cavity 29, as shown in FIGS. 5–7. The mold cavity 29 is designed to be used in rotational molding of thermoplastic material and the like, and the conjoined frames 24 and 27 are adapted to be releasably secured to a biaxially rotating arm, as is known in the art of rotational molding. The molding cavity 29 defines a molding surface, defined as all of the interior surface of the molding cavity that is wetted by the molten thermoplastic.

Figure 14:
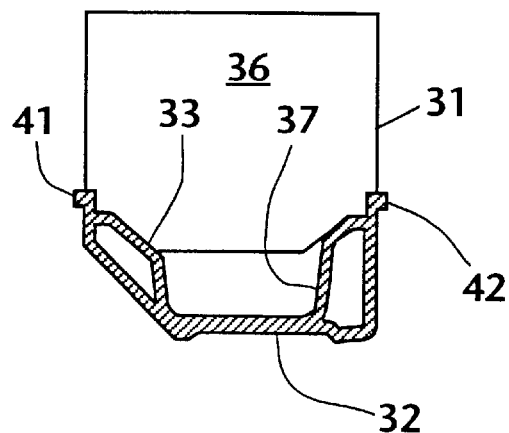
FIGS. 14–17 are a series of cross-sectional end elevations taken along lines 14—14, 15—15, 16–16, and 17—17 of FIG. 13.
Figure 15:
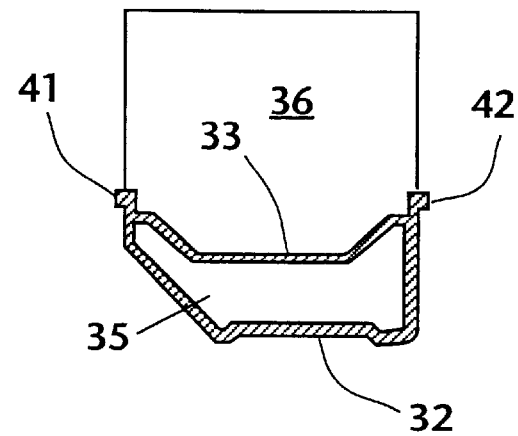
Figure 16:
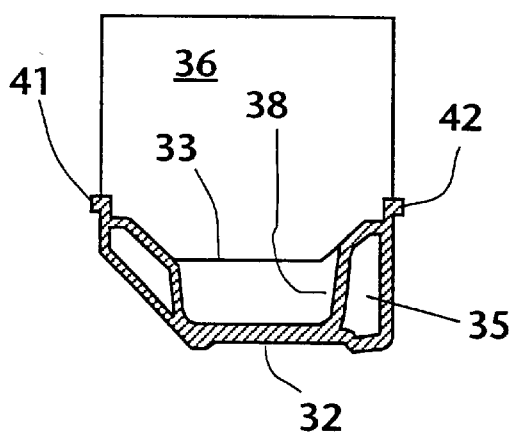
Figure 17:
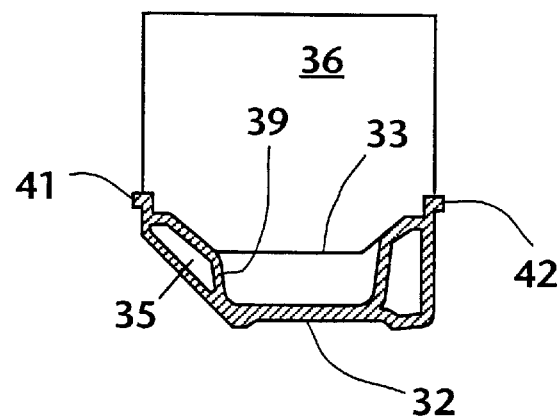

To illustrate the novelty and functionality of the invention, a preferred embodiment will be described with reference to molding a particular part, such as the bumper cover 31 depicted in FIGS. 12–17. However, the invention has far wider applicability, and is not limited to the particular use shown herein. The bumper cover 31 includes front wall 32 and rear wall 33 disposed in generally parallel, spaced apart disposition. The front wall 32 is a channel-like structure, with the rear wall 33 extending across the opening of the channel-like structure and defining a void 35 therebetween. An end wall 34 joins the front and rear walls at one end, and a tail panel 36 joins the other ends of the front and rear walls and extends obliquely outwardly from the rear wall 33. A trio of concave coffers 37, 38, and 39 are formed integrally in the rear wall 33, and extend into the void 35. The inner ends of the concave coffers 37–39 impinge on and merge with a thickened portion of the front wall 32, as shown in FIGS. 14, 16, and 17. The concave coffers 37–39 thus provide substantially enhanced strength and rigidity and impact resistance by connecting the opposed front and rear walls 32 and 33 with a plurality of closed, curved walls that act as column supports between the front and rear walls.

A further strengthening feature of the bumper cover is a pair of solid ribs 41 and 42 extending along the junction lines of the front and rear panels 32 and 33. These ribs bolster the strength of an edge portion of the bumper cover and resist the initiation of cracks in the structure at the vulnerable edge areas. It is noted that the ribs 41 and 42 are formed at the outer extremities of short, thin wall portions of the bumper cover.

It is noted that the formation of the ribs 41 and 42, and the merged sidewall portions at the conjunctions of the coffers 37–39 with front wall 32, both require that the rotational molding process provides flow of the liquid thermoplastic material into areas where the mold sidewalls must be closely spaced to define the desired dimensions of the molded part, yet are spaced too closely for reliable flow and uniform fill by the thermoplastic. To remedy this particular problem, and to enable rotational molding of closely spaced features in general, the invention provides a movable mold portion that forms portions of the closely spaced features in a more widely spaced apart disposition, so that the features are properly and fully formed. Thereafter, prior to solidification of the thermoplastic, the movable mold portion is moved inwardly in the mold cavity to bring these features into the proper spacing for the finished product, and the thermoplastic is cooled to form the finished part with the desired features in their proper spacing and dimensions.

With regard to FIGS. 2–7, the invention provides a mold insert 46 mounted in the mold component 26 and adapted to move inwardly in limited translational motion into the mold cavity 29. The mold insert 46 comprises a generally rectangular assembly having a generally convex molding surface 51 defining one side of the mold cavity 29 and having a surface conformation to create substantially all of the rear wall 33 of the bumper cover 31. In particular, the mold insert 46 includes a trio of protruding, convex coffers 47–49 dimensioned and configured in complementary fashion to the structural concave coffers 37–39, respectively, of the bumper cover. That is, each coffer 47–49 includes a rectangular root at the junction with the molding surface 51, and coffer sidewalls that are joined in smoothly radiused fashion at all junctions to define a curvilinear manifold that tapers inwardly. The mold insert is adapted to move inwardly in the mold cavity 29, as shown by arrows A in FIGS. 1 and 8.

Figure 8:
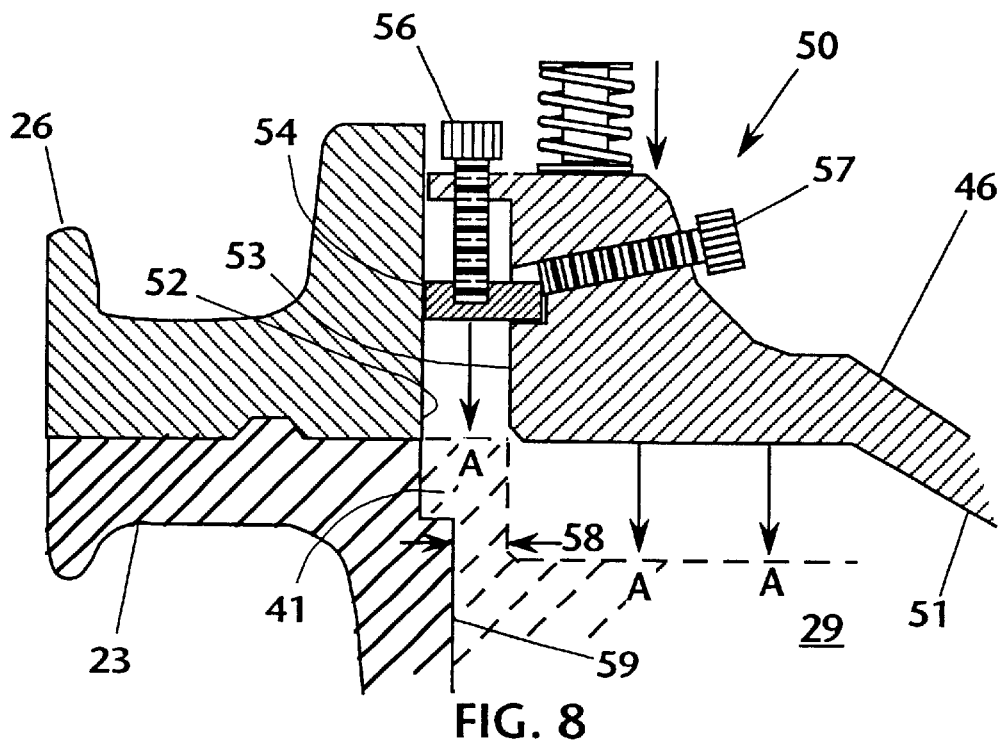
FIG. 8 is an enlarged, fragmentary, cross-sectional elevation depicting the arrangement of the mold components and mold insert in the present invention.
Figure 12:
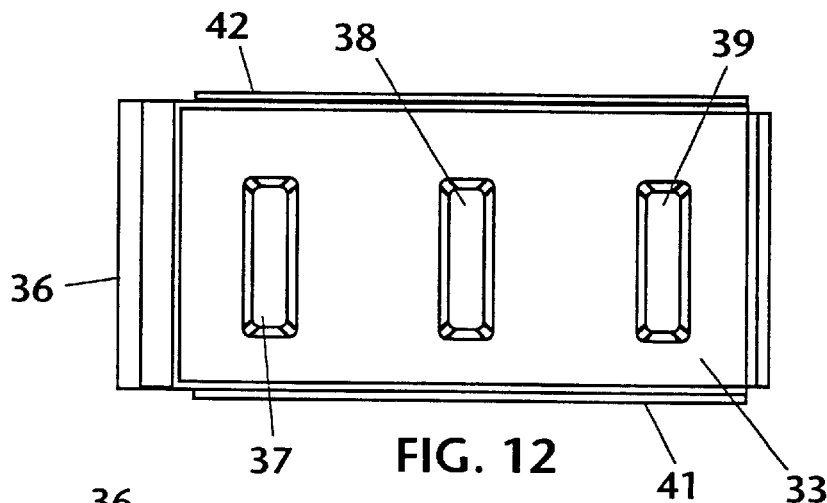
FIG. 12 is an inside elevation of a bumper cover fabricated using the method and apparatus of the present invention.
Figure 13:
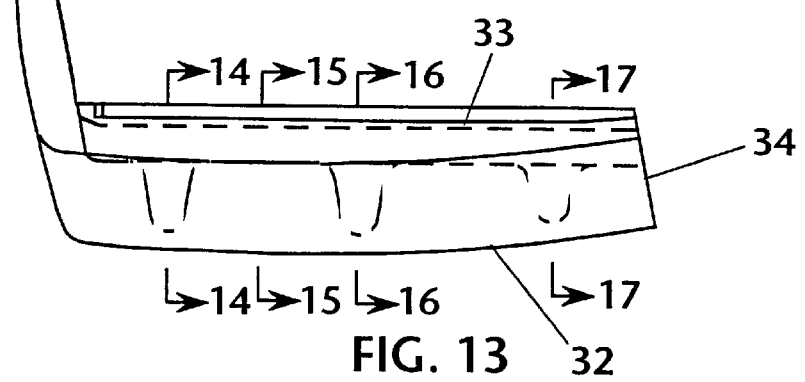
FIG. 13 is a top view of the bumper cover depicted in FIG. 12.

In addition, the mold insert 46 includes edge-forming assemblies 50 that extend along opposed longitudinal edges of the insert to form two surfaces of each of the solid ribs 41 and 42 of the bumper cover 31. With reference to FIG. 8, the mold component 26 includes an opening in which the mold insert 46 is received, the opening including a longitudinally extending surface 52 oriented parallel to the direction of travel arrows A. The mold insert 46 includes a surface 53 extending longitudinally parallel to the surface 52 and spaced apart therefrom a distance equal to the thickness of the solid rib 41 or 42 to be formed. A wear bar 54 extends from a slot in the surface 53 to the surface 52, and is supported by a plurality of screws 56 secured in the mold insert 46. The wear bar 54 extends generally transversely to the direction of travel A, and comprises a portion of the molding surface of the mold insert 46. A plurality of adjustment screws 57 extend from the mold insert 46 to control the position of the bar 54 and permit sliding translation of the bar 54 on surface 52 in the direction of travel A.

With the mold insert disposed in the outwardly extending position, as shown in FIG. 8, melted liquid thermoplastic may not reliably flow into the channel defined by the surfaces 52, 53, and the wear bar 54, and may not completely fill this channel. However, after the heated rotation step of the molding process, the mold insert is moved inwardly in direction A, and the molding surfaces 51 and the wear bar 54 move to the positions indicated by broken line in FIG. 8. The translation of the wear bar 54 in the channel compresses and solidifies all the thermoplastic material (indicated by hatched broken line) deposited therein by the rotation process, rectifying any voids or thin portions that might otherwise form. Thus the solid ribs 41 and 42 may be formed fully and reliably. It is noted that the mold surface spacing to form the thin wall section 58 that joins the ribs 41 or 42 to the bumper cover would not permit sufficient flow of thermoplastic material, and it is the provision of the mold insert to form the related surfaces in more spaced apart fashion that enables successful fabrication of the solid ribs.

Likewise, with the mold insert 46 disposed in the outwardly extending position, there is ample clearance for melted liquid thermoplastic to flow between the mold surface 61 of the mold component 23 and the inner extents of the convex coffers 47–49. Thus a full thickness of the thermoplastic material may be deposited on these surfaces, forming nascent plastic sidewalls. When the mold insert is moved inwardly in direction A, the nascent sidewalls at the surfaces 61 and 47–49 are brought into impingement, and the liquid thermoplastic merges to form an integral structure joining the opposed front and rear walls 32 and 33 without voids or defects. It is noted that the mold surface spacing required to form directly the junction portions of structural coffers 37–39 with front wall 32 would be too narrow to permit sufficient flow of thermoplastic material, and it is the provision of the mold insert to form the related sidewalls individually in more spaced apart fashion that enables successful fabrication of these features.

Figure 2:
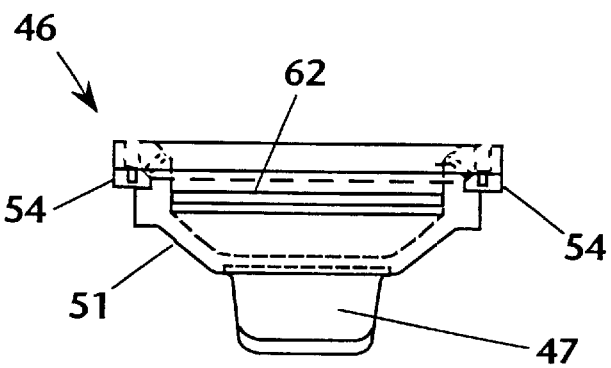
FIG. 2 is an end elevation of the mold insert of the present invention.
Figure 3:
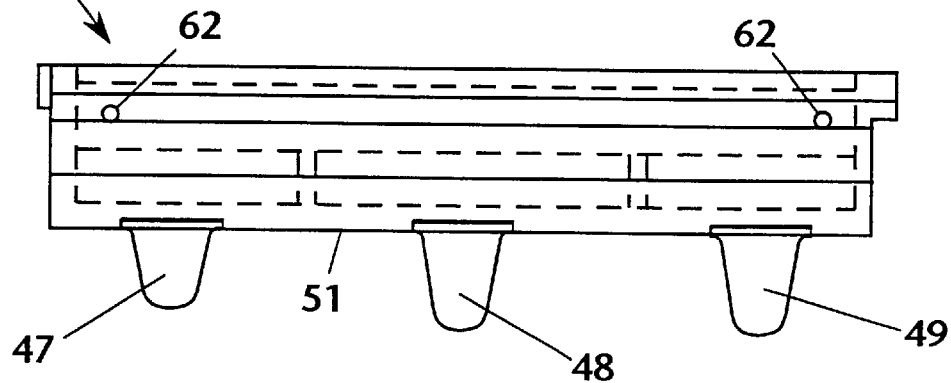
FIG. 3 is a side elevation of the mold insert of the present invention.
Figure 4:
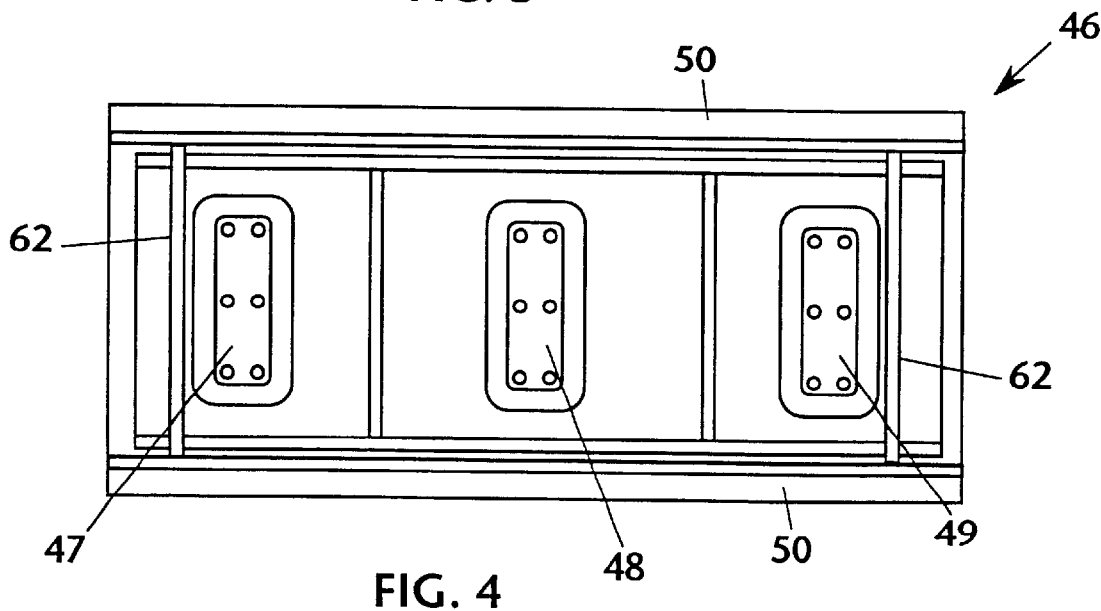
FIG. 4 is a top view of the mold insert shown in FIGS. 2 and 3.
Figure 9:
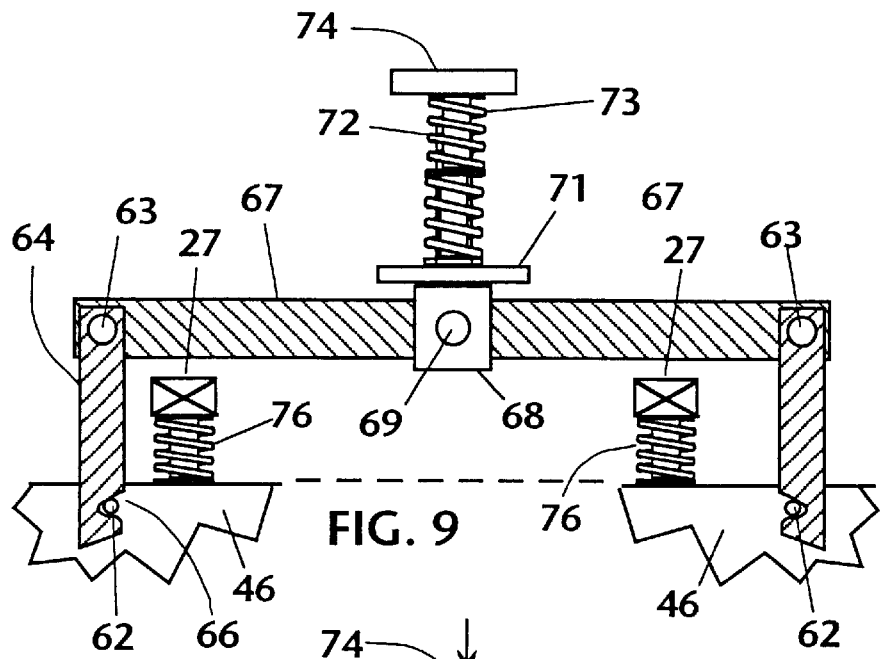
FIGS. 9–11 are a sequence of schematic views showing the operation of the latch mechanism of the invention.

The invention further provides a mechanism for supporting and translating the mold insert 46 inwardly. As shown in FIGS. 2–4, a pair of rods 62, extend transversely to the longitudinal edges of the mold insert 46, and are secured at opposed ends thereof. A pair of pivot shafts 63 are supported by the mold frame 27 parallel to the rods 62 and spaced apart therefrom. Joined rigidly to each shaft 63 are at least one (preferably a pair) of latch arms 64, each having a detent slot 66 at the distal end thereof. The slot 66 is adapted to releasably engage and retain the respective rod 62 of the mold insert. A pair of legs 67 are secured rigidly at one end to a respective shaft 63, and at the other end to a pivot pin 69 supported in a movable block 68. The block 68 is joined to a plunger 72 that extends through a strap 71 that is a rigid component of the frame 27. A touch pad 74 is disposed at the distal end of the plunger 72. A compression spring 73 is in a relaxed state when the mold insert 46 is in the outward disposition, as in FIG. 9. On the other hand, compression springs 76 are in a highly compressed state in the outward disposition of FIG. 9. The mold insert 46 may be thus supported in the outward disposition indefinitely.

Figure 1:
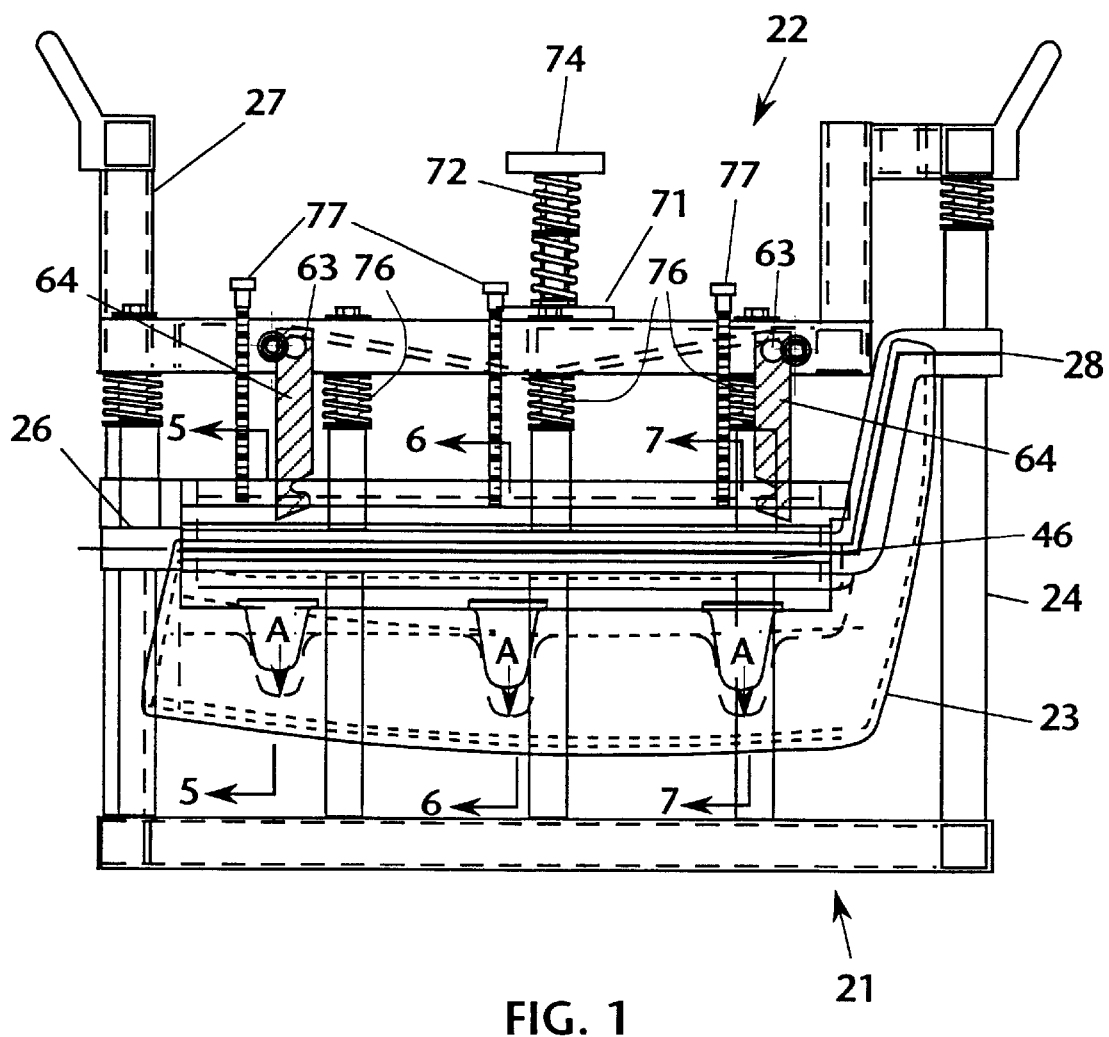
FIG. 1 is a side elevation of the mold assembly of the present invention for rotational molding.
Figure 10:
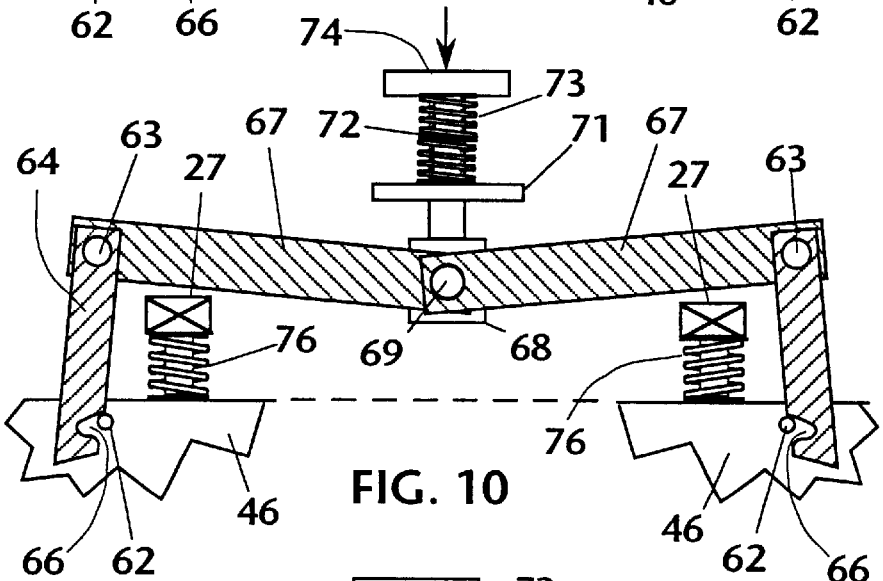
Figure 11:
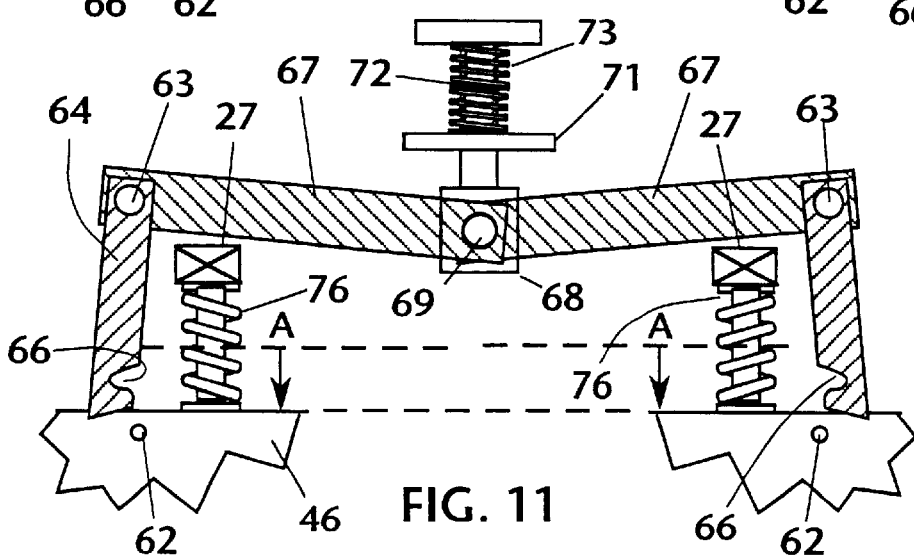

To move the mold insert inwardly in the mold, the touch pad 74 is struck or otherwise urged to depress the plunger 72, as shown in FIG. 10. The accompanying translational movement of the pivot pin 69 causes the legs 67 to counter-rotate the pivot shafts 63. As a result, the latch arms diverge angularly outwardly, and the detent slots 66 release the rods 62. The resilient force of springs 76 is then free to translate the mold insert 46 forcefully, as shown by the arrows A in FIG. 11. A plurality of bolts 77 extend from the mold insert 46 through the frame 27, as shown in FIG. 1, to limit the inward travel of the mold insert to a predetermined dimension within the range of a fraction of an inch to several inches.

It may be appreciated that the latch release mechanism is designed to be triggered during a rotational molding operation. That is, after the mold assembly (with the mold insert in the outward position) has undergone heating and rotation to liquefy and distribute a thermoplastic material inside the mold cavity 29, the mold assembly is transferred to a cooling station. At this point in the process, and while the mold continues to be rotated, the touch pad 74 may be struck by a worker to release the latch mechanism and cause the mold insert to be driven inwardly. Thereafter the cooling operation continues until the plastic solidifies into a finished part, rotation stops, and the mold components are separated to remove the finished part. The mold insert may then be moved outwardly and re-latched in the outward disposition, and the mold assembly is thus prepared for the next rotational molding cycle. The mold assembly may be reset and re-used indefinitely.

The method of the invention includes in general the steps of providing a rotational mold having a movable insert placed in an outwardly extending position, and charging the mold and heating and rotating the mold to melt and distribute a thermoplastic material. It also includes the steps of triggering a mechanism to urge the mold insert to translate inwardly in the mold cavity to bring into closer proximity some opposed features of the mold cavity. The mold is then cooled, and the finished part removed. The method also includes the steps of resetting the mold insert to the outwardly extending position, and reusing the mold reiteratively and indefinitely.

Other mechanisms for translating the mold insert inwardly in the mold cavity may be provided without deviating from the spirit and scope of the invention. For example, some rotational molding machines known in the prior art are capable of delivering pressurized gas to the interior of the mold during the molding process. The mold assembly described herein may be modified to include a pneumatic cylinder connected to the pressurized gas source of the molding machine, either to translate the mold insert directly, or to trigger the spring-operated translating mechanism described herein. In either case, the selective application of pneumatic pressure may then cause the mold insert to translate inwardly in the rotational mold at the end of the heating stage of the rotational molding process. The advantage of this arrangement is that the pneumatic pressure source may be actuated automatically at the end of the heating cycle, thereby obviating a source of operator error; i.e., failure to manually trigger the mold insert translating mechanism. Likewise, other automatic triggering arrangements may employ thermal triggering mechanisms that respond to exposure to the high temperature of the heating cycle for a predetermined length of time.

It should be emphasized that the method and apparatus of the invention may be practiced on a wide range of molded parts formed by rotational molds, and is not limited to the example of the bumper cover described herein. Any molded part formed by rotational molding that includes features so closely spaced that the mold surfaces may not permit complete filling by the molten thermoplastic may instead be created by the mold apparatus and method of this invention.

The foregoing description of the preferred embodiments of the invention has been presented for purposes of illustration and description. It is not intended to be exhaustive or to limit the invention to the precise form disclosed, and many modifications and variations are possible in light of the above teaching without deviating from the spirit and the scope of the invention. The embodiments described are selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

What is claimed is:

1. A method for rotational molding, including the steps of:
providing a rotational mold having a closed interior cavity having a molding surface conformed to create a fabricated plastic part;
providing a movable mold insert in said rotational mold, said mold insert having formed thereon a movable portion of said molding surface;
placing said mold insert in an outwardly extending disposition;
charging said rotational mold with a thermoplastic material;
heating and rotating said mold to melt and distribute said thermoplastic material uniformly about said molding surface;

moving said mold insert inwardly in said interior cavity to translate said movable portion of said molding surface inwardly in said interior cavity while rotating and cooling said mold to compress and solidify said thermoplastic material; and opening said mold to remove said fabricated plastic part.

2. The method for rotational molding of claim 1, further including the step of providing rib forming features on said movable mold insert.

3. The method for rotational molding of claim 1, further including the step of providing said movable portion of said molding surface with structural coffer forming features extending therefrom into said interior cavity.

4. The method for rotational molding of claim 1, further including the step of providing a latch mechanism to selectively release and move said mold insert inwardly in said interior cavity.

5. The method for rotational molding of claim 4, further including the step of providing a touch plate for enabling triggering of said latch mechanism while said mold is rotating.

* * * * *